US011033831B2

(12) United States Patent
Minne et al.

(10) Patent No.: US 11,033,831 B2
(45) Date of Patent: Jun. 15, 2021

(54) TRAY FOR A MASS-TRANSFER COLUMN

(71) Applicants: thyssenkrupp Industrial Solutions AG, Essen (DE); thyssenkrupp AG, Essen (DE)

(72) Inventors: Pascal Minne, Dortmund (DE); Horst Honecker, Lünen (DE)

(73) Assignees: THYSSENKRUPP INDUSTRIAL SOLUTIONS AG, Essen (DE); THYSSENKRUPP AG, Essen (DE)

( * ) Notice: Subject to any disclaimer, the term of this patent is extended or adjusted under 35 U.S.C. 154(b) by 123 days.

(21) Appl. No.: 16/496,856

(22) PCT Filed: Mar. 15, 2018

(86) PCT No.: PCT/EP2018/056575
§ 371 (c)(1),
(2) Date: Sep. 23, 2019

(87) PCT Pub. No.: WO2018/172188
PCT Pub. Date: Sep. 27, 2018

(65) Prior Publication Data
US 2020/0094161 A1    Mar. 26, 2020

(30) Foreign Application Priority Data

Mar. 22, 2017  (DE) .................... 10 2017 106 177.0

(51) Int. Cl.
*B01D 3/16*   (2006.01)
*B01D 3/22*   (2006.01)
*B01D 53/18*  (2006.01)

(52) U.S. Cl.
CPC .............. *B01D 3/166* (2013.01); *B01D 3/22* (2013.01); *B01D 53/185* (2013.01)

(58) Field of Classification Search
CPC .......... B01D 3/166; B01D 3/22; B01D 3/324; B01D 53/18; B01D 53/185
(Continued)

(56) References Cited

U.S. PATENT DOCUMENTS 3,172,922 A  *  3/1965  Kehse ...................... C11B 3/14
                                                      261/20
3,787,479 A  *  1/1974  Oriehl et al. ........... C07C 69/82
                                                      560/92
(Continued)

FOREIGN PATENT DOCUMENTS

CH           655448 B      4/1986
DE           1249846 B     9/1967
(Continued)

OTHER PUBLICATIONS

English Translation of International Search Report issued in PCT/EP2018/056575, dated Jun. 4, 2018.

*Primary Examiner* — Charles S Bushey
(74) *Attorney, Agent, or Firm* — thyssenkrupp North America, LLC (57) ABSTRACT

A tray for a mass-transfer column permits contact between a liquid phase and a gas phase. The tray may comprise a tray feed via which the tray is charged with the liquid phase, a tray drain via which the liquid phase drains from the tray, and first guide means for guiding the liquid phase where the first guide means forms a first course path along which the liquid phase flows from the tray feed to the tray drain, enabling contact with the gas phase. A second guide means may form a second course path overlapping with the first course path, which leads from an inlet to an outlet. The first guide means may have at least two partial concentric paths. Temperature-control fluid may flow along the second course (Continued)

path in at least one of the at least two partial paths opposite the flow direction of the liquid phase.

15 Claims, 5 Drawing Sheets

(58) Field of Classification Search
USPC .................. 261/114.1, 114.5, 127, 152, 155
See application file for complete search history.

(56) References Cited

U.S. PATENT DOCUMENTS

| | | | |
|---|---|---|---|
| 5,464,590 A * | 11/1995 | Yount | B01J 19/24 |
| | | | 422/131 |
| 5,466,419 A | 11/1995 | Yount | |
| 7,988,134 B2 | 8/2011 | Alzner | |
| 9,427,678 B2 | 8/2016 | Bechtel | |
| 2002/0092646 A1 | 7/2002 | Kuhn | |
| 2007/0251679 A1* | 11/2007 | Noda | B01D 3/14 |
| | | | 165/144 |

FOREIGN PATENT DOCUMENTS

| | | |
|---|---|---|
| DE | 1957458 A | 7/1971 |
| DE | 69503624 T | 11/1998 |
| DE | 10000288 C | 5/2001 |
| KR | 10-1997-7002749 A | 6/1997 |
| KR | 10-2014-0101369 A | 8/2014 |
| WO | 2013072353 A | 5/2013 |

* cited by examiner

TRAY FOR A MASS-TRANSFER COLUMN

CROSS REFERENCE TO RELATED APPLICATIONS

This application is a U.S. National Stage Entry of International Patent Application Serial Number PCT/EP2018/056575, filed Mar. 15, 2018, which claims priority to German Patent Application No. DE 10 2017 106 177.0, filed Mar. 22, 2017, the entire contents of both of which are incorporated herein by reference.

FIELD

The present disclosure generally relates to trays for mass-transfer columns.

BACKGROUND

Mass-transfer columns, such as an absorption column, a rectification column, a stripping column, or a distillation column, have already been found for decades in chemical plant construction.

For example, a material separation takes place in a mass-transfer column by intensive contact of a liquid phase with a gas phase. In this case, the liquid phase can run from top to bottom through the mass-transfer column, and the gas phase can be guided in the opposite direction from bottom to top through the mass-transfer column.

To ensure the contact between the liquid phase and the gas phase, a plurality of trays arranged one on top of another can be provided in the mass-transfer column, wherein the trays can each be formed as transverse flow trays, in which the liquid runs over the tray.

Furthermore, mass-transfer elements can be provided in a respective tray, such as gas passage openings, through which the rising gas rises through the liquid.

The trays arranged one on top of another can be connected to one another by means of feed shafts and/or drain shafts. Such shafts can conduct the liquid phase to the next tray and can be used, for example, as a guide of degassed liquid from one tray to the tray located underneath. Such shafts are also known under the term downcomer.

The document WO 2013/072353 A1 discloses in this context a tray for a mass-transfer column having gas passage openings, which are arranged distributed over the tray, and also at least one baffle plate for flow deflection of liquid flowing on the tray, wherein the tray can be charged with a liquid via at least one feed, wherein the tray comprises at least one feed, at least one separating weir, which separates the inflowing liquid into two flows, and at least two drains, or comprises at least two feeds and at least one drain for the liquid, wherein each flow flows along a flow path to a drain.

DE 695 03 624 T2 can be cited as further prior art.

Thus a need exists for a tray for a mass-transfer column that offers improved properties with respect to manufacturing and/or with respect to the thermodynamic behavior during mass transfer.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present document relates to trays for mass-transfer columns, such as absorption columns, rectification columns, stripping columns, and distillation columns. Moreover, the present disclosure relates to example mass-transfer columns that comprise a plurality of such trays.

According to one embodiment, the tray comprises: a tray feed, via which the tray is charged with the liquid phase; a tray drain, via which the liquid phase drains from the tray; first guide means for guiding the liquid phase, wherein the first guide means form a first course path, along which the liquid phase flows from the tray feed to the tray drain; an inlet for a temperature-control fluid; an outlet for the temperature-control fluid; and second guide means for guiding the temperature-control fluid for heat exchange with the liquid phase, wherein the second guide means form a second course path overlapping with the first course path, which leads from the inlet to the outlet. The first guide means for guiding the liquid phase form the first course path having at least two partial paths, which are arranged concentrically in relation to one another and each extend in the form of a partial circular path. In this case, the temperature-control fluid flows along the second course path in at least one of the at least two partial paths in a direction opposite to the flow direction of the liquid phase.

For example, the second course path thus extends completely or nearly completely along the first course path, so that where the heat exchange takes place between the liquid phase and the temperature-control fluid, the temperature-control fluid flows opposite to the flow direction of the liquid phase in at least one of the partial paths. For example, the flowing liquid phase thus "sees" a temperature-control fluid flowing opposite to it in route sections during its travel from the tray feed to the tray drain. In this manner, an improved energy exchange can take place between the liquid phase and the temperature-control fluid.

The heat exchange can take place either by absorption of heat of the liquid phase by the temperature-control fluid or by emission of heat by the temperature-control fluid. In the first case, cooling of the liquid phase thus takes place, and in the second case heating of the liquid phase takes place. The case which is applied is dependent on the respective processing requirements.

Moreover, because of the partial paths extending in the form of a partial circular path of the first course path and the second course path overlapping with the first course path, the first guide means for the liquid phase and the second guide means for the temperature-control fluid can be manufactured cost-effectively.

Further exemplary and optional features of further embodiments of the tray will be presented hereafter. These features can be combined with one another to form still further embodiments, if they are not expressly identified as alternative to one another. In this case, instead of the term "liquid phase", the term "liquid" is also used, wherein both terms have the same meaning. This applies similarly to the terms "gas phase" and "gas".

In one embodiment, the tray feed comprises a first entry, which is arranged on an edge of the tray. Furthermore, it can be provided that the tray drain comprises a first exit, which is arranged in a center of the tray, and the first guide means comprise concentrically arranged conducting weirs, which form the first course path. The tray can be embodied in a circular form, for example, and can be delimited by a tray edge. The tray center is arranged in the middle of the circular tray, wherein this is not necessarily to be understood as a point, but rather also a centrally arranged small partial area of the total surface of the tray. The concentrically arranged conducting weirs form the partial paths extending in the form of a partial circular path in this embodiment, which will be explained in greater detail at a later point, in particular with regard to the appended drawings.

The concentric arrangement of the partial paths can be embodied, for example, in such a way that each partial path comprises a specific radius with respect to the tray center, wherein an outer partial path comprises a maximum radius, and the radius decreases with each partial path, so that an inner partial path comprises a minimum radius.

In a further embodiment, all partial paths of the first course path describe a rotation of at least 90° and of at most 180°. For example, it can be provided that the partial paths describe a rotation of somewhat less than 180°, for example, a rotation in the range of 130° to 175°.

In a further embodiment, it is provided that the liquid phase flows in a first of the at least two partial paths of the first course path along one rotational direction and flows in a second of the at least two partial paths in the opposing rotational direction. To implement said counterflow principle between liquid phase and temperature-control fluid, it can be provided that the temperature-control fluid moves in both partial paths mentioned here by way of example only in the rotational direction or only in the opposing rotational direction in each case, so that in at least one of the two partial paths, the flowing liquid phase "sees" a temperature-control fluid flowing opposite to it.

In one refinement, it can be provided that the second guide means for guiding the temperature-control fluid form the second course path having a plurality of individual paths arranged concentrically in relation to one another and each extending in the form of a partial circular path. These individual paths of the second course path overlap, for example, with the first course path for the liquid phase. In this case, the guide means can be formed as pipelines, which are arranged for a contact with the liquid phase and extend parallel to the first course path.

For example, all individual paths describe substantially a semicircular path, which exits out of the inlet and opens into the outlet. These individual paths overlap with the partial paths of the first course path of the liquid phase, so that said counterflow principle occurs in at least one of the partial paths, in which the temperature-control fluid and the liquid phase flow in rotational directions opposite to one another, and a continuous flow principle is implemented in at least one other partial path, in which the temperature-control fluid and the liquid phase flow in identical rotational directions.

For this purpose, it can be expedient that the inlet and the outlet for the temperature-control fluid are arranged along a longitudinal axis intersecting the tray center, wherein the longitudinal axis divides the tray into a first section and a second section. The two sections can be substantially semicircular halves of the circular tray according to the statements above.

For example, in one embodiment the inlet and the outlet for the temperature-control fluid are arranged offset by 180° in relation to one another and the individual paths of the second course path provided in the first section of the tray lead the temperature-control fluid in only one rotational direction, and the individual paths of the second course path provided in the second section of the tray lead the temperature-control fluid only in the opposing rotational direction. The individual paths arranged concentrically in relation to one another can thus each exit out of the inlet and lead substantially along a semicircular path to the outlet, into which they open.

For example, the individual paths cover the predominant part of the tray, and it can thus be expedient for the inlet for the temperature-control fluid to extend from the tray edge toward the tray center, for example, along a length which is at least 80% of the radius of the tray. It can also be expedient for the outlet for the temperature-control fluid to extend from the tray edge toward the tray center along a length of at least 80% of the radius of the tray.

In a further embodiment, the first guide means comprise at least three first conducting weirs arranged in the first section of the tray, which form the first course path therein for the liquid phase having at least three partial paths linked to one another, which extend concentrically in relation to one another, i.e., can be arranged offset in relation to one another in the radial direction, wherein the liquid phase passes through at least three partial paths and changes its flow direction by 180° with each transition between two partial paths. Described visually, for example, a first partial path of the first course path thus extends along an outer partial circular path and describes a rotation by almost 180°, for example, by 170°. If the liquid phase reaches the end of the first partial path, its flow direction rotates by 180°, so that the liquid phase flows in the second partial path adjoining the first partial path in the opposite rotational direction and at the same time describes a rotation by again almost 180°, for example, by 170°. Reaching the end of the second partial path, the flow direction of the liquid phase rotates by 180° to flow further in the third partial path, which adjoins the second partial path and is in the form of a partial circular path, in the rotational direction (as in the first partial path). Either the flow of the liquid phase then opens at the end of the third partial path into the first exit of the tray drain provided at the tray center, or it completes one or more further semicircular rotations in accordance with the above-described pattern.

In one refinement, the tray feed comprises a second entry, which is arranged at the tray edge, and the tray drain comprises a second exit, which is arranged in the tray center.

In this case, the first entry and the first exit can be located in the first section of the tray, and the second entry and the second exit can be located in the second section of the tray. Moreover, it can be provided in this refinement that the guide means comprise at least three second conducting weirs arranged in the second section of the tray, which form the first course path therein having at least three partial paths linked to one another, which extend concentrically to one another, i.e., can be arranged offset in relation to one another in the radial direction, wherein the liquid phase passes through the at least three partial paths and changes its flow direction with each transition between two partial paths by 180°, for example, in a manner as has been described above for the first section.

According to one embodiment, the first section of the tray and the second section of the tray can thus be embodied mirror-symmetrically, in relation to the longitudinal axis, with respect to the guiding of the liquid phase and the temperature-control fluid.

For example, the first guide means can comprise a separating weir arrangement arranged along the longitudinal axis, which separates the liquid phase in the first section from the liquid phase in the second section. The separating weir arrangement can ensure, for example, that the liquid phase can be guided in two separate flow paths, namely along a flow path in the first section and separately therefrom along a flow path in the second section.

For example, all partial paths formed by the first guide means and all individual paths formed by second guide means are substantially in the form of semicircular paths, as has been described above by way of example. With each transition between two partial paths, the flow direction of the liquid phase can change by 180°, wherein because of the semicircular path shape of the partial paths, this flow direction change of the liquid phase is equivalent to a sign change of the rotational direction. For example, the flow direction of the liquid phase changes at least twice by 180° in each case in the first section and in the second section of the tray, wherein the total number of the flow direction changes by 180° in the respective section can be an odd number.

The above-mentioned conducting weirs of the first guide means for the liquid phase extend, for example, like a cylinder wall section from the tray opposite to the vertical direction. In this case, one conducting weir can be used to delimit two successive partial paths of the first course path. Because of the above-mentioned flow direction change of the liquid phase with each transition between two partial paths, the liquid phase flows in opposite directions at each such conducting weir, for example, clockwise on one side and counterclockwise on the other side, i.e., in the other partial path. This can contribute to homogenizing the mass-transfer process, for example, it can promote an absorption of the gas phase by the liquid phase homogenized over the surface.

Several embodiments provide the at least partial implementation of a counterflow principle by corresponding embodiment of the first course path for the liquid phase and the second course path for the temperature-control fluid, according to which the temperature-control fluid flows on the tray opposite to the flow direction of the liquid phase, which can ensure an improved energy exchange.

The temperature-control fluid can be a gas and/or vapor or a liquid. For example, a fluid drive device is provided, such as a pump, which causes the gas and/or the vapor or the liquid to flow along the second course path.

The second guide means can comprise, as noted, pipelines, wherein a bending radius of the pipelines along at least 80% of the entire second course is greater than a predetermined minimal value. The minimal value can be selected so that material-specific limits are not exceeded. In particular, the semicircular arrangement of the pipelines can permit a comparatively large bending radius. In contrast, to implement a meandering course, as is known, for example, from the document WO 2013/072353 A1 mentioned at the outset, small bending radii are necessary to implement the 180° turns in a narrow space. The large bending radius places significantly lower demands on the mechanical quality of the material of the pipelines, whereby the material of the pipelines can be optimized with respect to other properties, for example, with respect to the corrosion resistance, but does not have to be selected with regard to the smallest possible bending radius.

The pipelines for guiding the temperature-control fluid, as already indicated above, can extend along the entire or at least along nearly the entire first course path, for example, in such a way that the liquid phase comes into direct contact with the outer walls of the pipelines. In other words, the pipelines can extend parallel to the flow path of the liquid phase. In this case, multiple pipelines can be arranged adjacent to one another, for example, up to ten pipelines, and the pipelines can also be provided in multiple layers, for example, in three layers located one on top of another.

The tray can be designed, for example, as a screen tray, valve tray, bell tray, or tunnel tray. The contact between the liquid phase and the gas phase can be ensured, for example, by a plurality of mass-transfer elements, wherein the mass-transfer elements can comprise gas passage openings (for example, screen holes) provided in the tray, fixed valves, movable valves, bells, or tunnels.

A mass-transfer column is also proposed here, comprising a plurality of trays arranged one on top of another, which are each embodied in accordance with one of the above-described embodiments. The mass-transfer column can be an absorption column, a rectification column, a stripping column, or a distillation column.

For example, the mass-transfer column is an absorption column for producing nitric acid.

Further features and advantages will become clear to a person skilled in the art in consideration of the study of the following detailed description and by viewing the appended drawings.

Reference is now made to the appended drawings, which also are associated with the detailed description and in which the illustration of specific examples show how the present disclosure can be implemented in practice.

In this context, direction-specifying terminology, for example, "upper", "lower", "outer", "inner", etc. can be used with reference to the alignment of the figures which are described. Since parts of embodiments can be positioned in an array of different alignments, the direction-specifying terminology can be used for the purposes of the illustration and is in no way restrictive. It is to be noted that other embodiments can be applied and structural or logical modifications can be executed without deviating from the scope of protection of the present invention. The following detailed description is therefore not to be understood in a restrictive meaning, and the scope of protection of the present invention is defined by the appended claims.

Reference will now be made in detail to various embodiments and to one or more examples, which are illustrated in the figures. Each example will be presented in an explanatory manner and is not to be interpreted as a restriction of the invention. For example, features which are illustrated or described as part of one embodiment can be applied to or in conjunction with other embodiments to produce still a further embodiment. It is intended that the present invention comprises such modifications and variations. The examples are described with application of a specific language, which is not to be understood as restricting the scope of protection of the appended claims. The drawings are not shown to scale and are used solely for illustration. For better comprehension, if not indicated otherwise, the same elements have been identified by the same reference signs in the various drawings.

Figure 1:
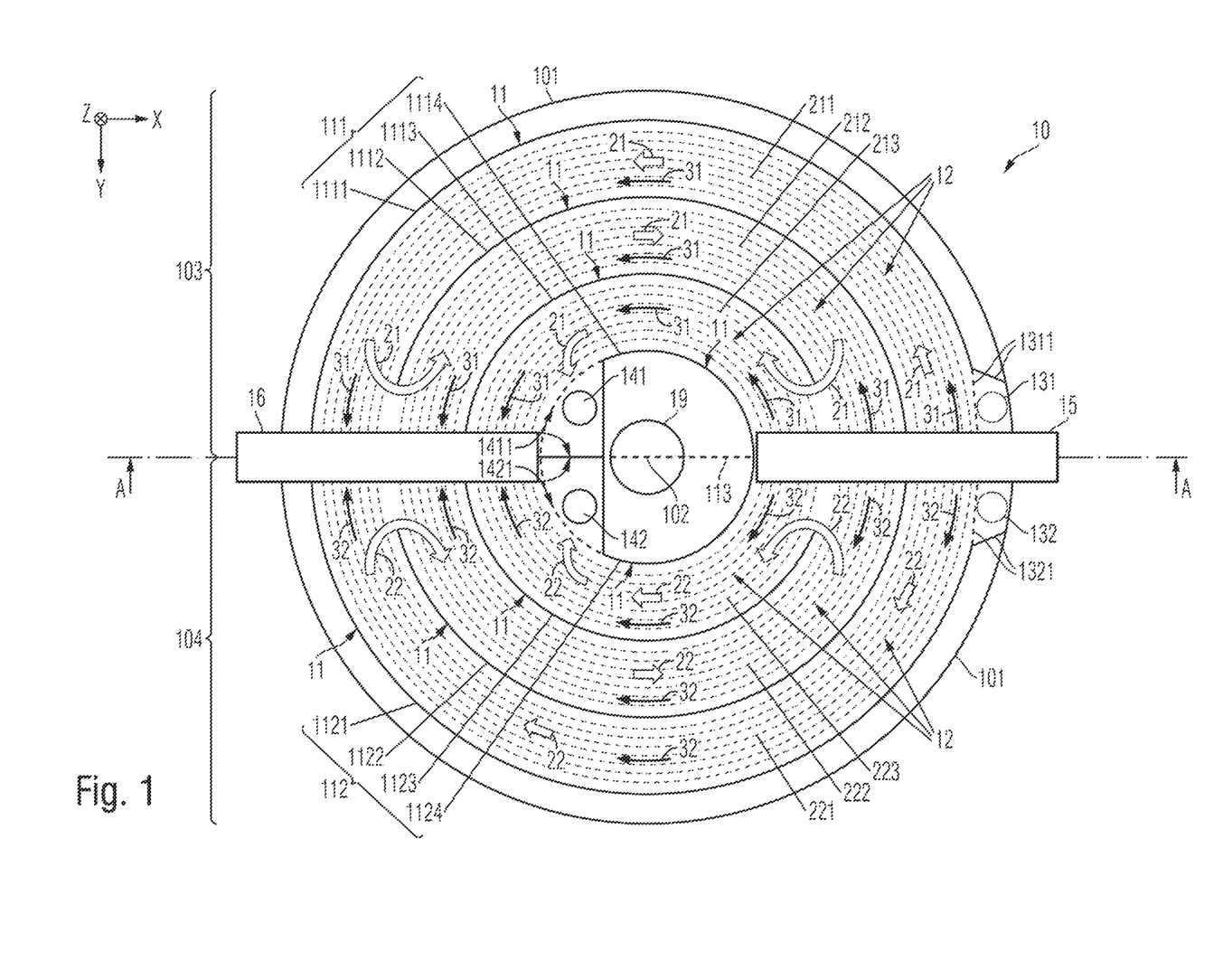
FIG. 1 is a schematic horizontal cross-sectional view of a section of an example tray for a mass-transfer column.
Figure 2:
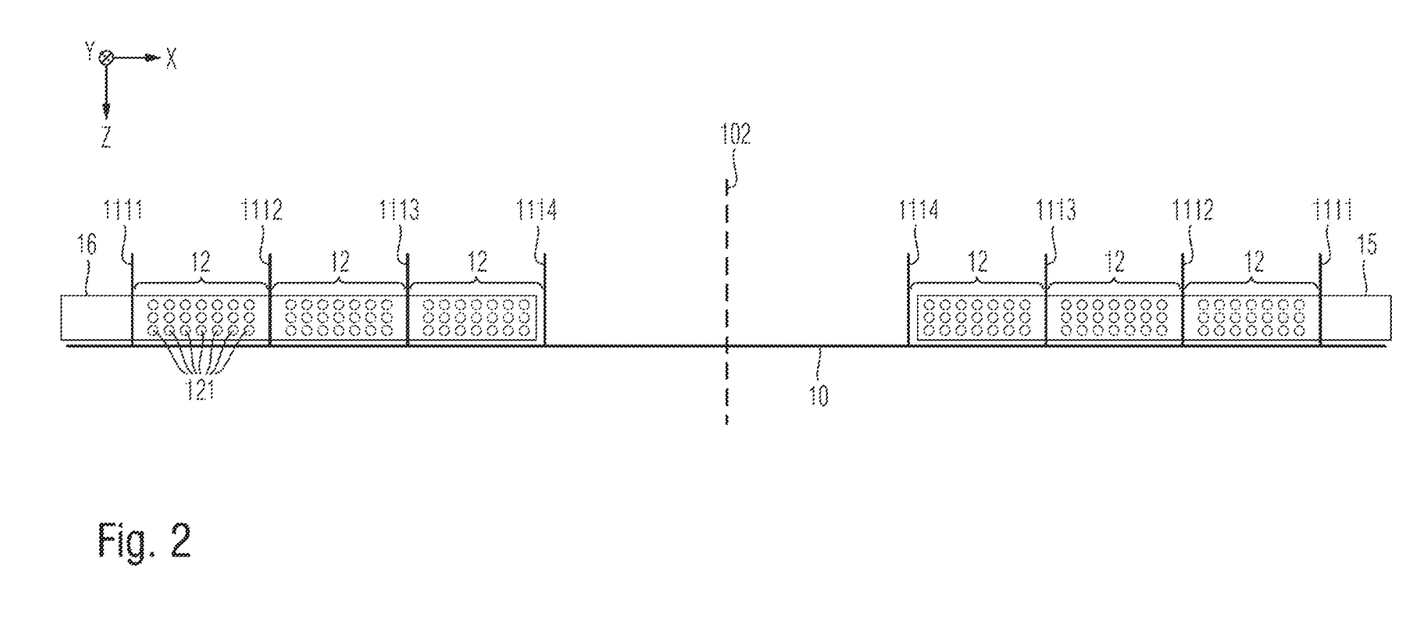
FIG. 2 is a schematic vertical cross-sectional view of a section of an example tray for a mass-transfer column.

FIG. 1 shows schematically and by way of example a horizontal cross-sectional view in the XY plane of a section of a tray 10 for a mass-transfer column according to one or more embodiments, and FIG. 2 shows in this regard schematically and by way of example a vertical cross-sectional view in the XZ plane at the section line A. Reference is made hereafter to both figures.

The tray 10 for a mass-transfer column (see reference sign 1 in FIG. 5 and FIG. 6) comprises a tray feed 131, 132, via which the tray 10 is charged with a liquid phase, and a tray drain 141, 142, via which the liquid phase drains from the tray 10. The tray 10 can be embodied as circular, and additionally can be delimited by a tray edge 101 and can comprise a tray center 102. The tray 10 is designed to enable a contact between the liquid phase and a gas phase.

Moreover, the tray 10 can be divided by a longitudinal axis A into a first section 103 and a second section 104, which can each be formed approximately semicircular. As will be explained hereafter, the tray 10 can be formed mirror-symmetrical with respect to several components in relation to the longitudinal axis A.

The tray feed comprises, for example, a first entry 131 arranged at the tray edge 101, which is located in the first section 103, and a second entry 132 also arranged at the tray edge 101, which is located in the second section 104. Via these two entries 131, 132 of the tray feed, the tray 10 can receive, for example, the liquid phase from a tray located above it or from a main entry for the liquid phase of the mass-transfer column.

Corresponding thereto, the tray drain can comprise, for example, a first exit 141 provided in the tray center 102, which is located in the first section 103, and a second exit 142 also provided in the tray center 102, which is located in the second section 104. The liquid drains from the tray 10 via these two exits 141 and 142, for example, down to a tray of the mass-transfer column located underneath or to a main exit of the mass-transfer column.

In addition, a so-called manhole 19 can be provided in the tray center 102, via which an inspection of the tray can be performed, for example, by inspectors.

The tray feed can comprise a feed weir 1311 or 1321, respectively, at its entries 131 and 132, to set a level of the liquid phase on the tray 10. In addition, a respective drain weir 1411 or 1421, respectively, can be provided on sides of the tray drain in the vicinity of the two exits 141 and 142. Such weirs are known per se to a person skilled in the art and do not require further explanation here.

Furthermore, first guide means 11 are provided for guiding the liquid phase, wherein the first guide means 11 form a first course path 21, 22, along which the liquid phase flows from the tray feed 131, 132 toward the tray drain 141, 142, wherein the first course path 21, 22 can be designed to guide the liquid phase on the tray 10. The contact between the liquid phase and the gas phase can be ensured, for example, by mass-transfer elements, for example, gas passage openings (not shown), which can be arranged distributed in the tray 10. Such mass-transfer elements are also known in principle to a person skilled in the art and are not explained in greater detail here. The present invention is in particular not restricted to specific mass-transfer elements.

To influence the temperature of the liquid phase, a temperature-control fluid is guided along the first course path 21, 22, which executes a heat exchange with the liquid phase, either to cool the liquid phase or to heat it. The heat exchange can thus take place either by absorption of heat of the liquid phase by the temperature-control fluid or by emission of heat by the temperature-control fluid to the liquid phase. In the first case, cooling of the liquid phase thus takes place, and in the second case heating of the liquid phase takes place. The case which is applied is dependent on the respective processing requirements.

For these purposes, the tray 10 comprises an inlet 15 for the temperature-control fluid and an outlet 16. Furthermore, second guide means 12 are provided, which form a second course path 31, 32, which overlaps with the first course path 21, 22 and leads from the inlet 15 to the outlet 16. The temperature-control fluid can be a gas and/or vapor or a liquid. For example, a fluid drive device (not shown) is provided, such as a pump, which causes the gas or the liquid to flow along the second course path 31, 32. The second guide means 12 can comprise pipelines 121, through which the temperature-control fluid is guided, which will be explained in greater detail hereafter.

In the following, firstly specific embodiments of the first guide means 11 for guiding the liquid phase are to be explained, and then the guiding of the temperature-control fluid by means of the second guide means 12 will be discussed:

The first guide means 11 for guiding the liquid phase form the first course path 21, 22 having at least two partial paths arranged concentrically in relation to one another (i.e., offset in relation to one another in the radial direction) and each extending in the form of a partial circular path. In the exemplary embodiment according to FIG. 1, a total of six partial paths are provided, of which three partial paths 211, 212, 213 are provided in the first section 103, and the remaining three partial paths 221, 222, and 223 are provided in the second section 104.

However, it is apparent that the present invention is not restricted to such a number of partial paths. For example, it could also be provided that only two partial paths are provided in each section 103 and 104, or that a total of only two partial paths are provided, which extend over the tray 10. The number of the partial paths could, of course, also be greater than six, for example, five partial paths could be provided in each section 103 and 104.

However, it has proven to be expedient for the number of the partial paths in the first section 103 and in the second section 104 to be equal, and the number of the partial paths in each section to be an odd number, as will become clear from the following statements.

All partial paths of the first course path 21, 22 can each substantially describe a semicircular path shape, as is illustrated schematically by way of example in FIG. 1.

For example, at least three arranged first conducting weirs 111 are provided in the first section 103 of the tray 10, which form the first course path 21 therein having at least three partial paths 211, 212, and 213 linked to one another, which extend concentrically to one another, wherein the liquid phase passes through the at least three partial paths 211, 212, 213 and changes its flow direction with each transition between two partial paths by 180°. Furthermore, the first guide means 11 can comprise at least three second conducting weirs 112 arranged in the second section 104 of the tray 10, which form the first course path 22 therein having at least three partial paths 222, 222, and 223 linked to one another, which extend concentrically to one another, wherein the liquid phase passes through the at least three partial paths 221, 222, and 223 and changes its flow direction with each transition between two partial paths by 180°.

The first guide means 11 can additionally comprise a separating weir arrangement 113 (not shown in FIG. 1, see FIG. 3 and FIG. 4) arranged along the longitudinal axis A, which separates the liquid phase in the first section 103 from the liquid phase in the second section 104. The separating weir arrangement 113 can ensure, for example, that the liquid phase can be guided in two separate flow paths 21 and 22, namely along the flow path 21 in the first section 103 and separately therefrom along the flow path 22 in the second section 104.

Specifically, the first guide means 11 can be formed in the exemplary embodiment according to FIG. 1 to guide the liquid phase as follows: In the first section 103, the tray 10 is charged with the liquid phase via the first entry 131. The liquid phase passes over the feed weir 1311 and thus enters the first partial path 211 of the first section 103. The first partial path 211 is delimited by the two conducting weirs 1111 and 1112. The first conducting weir 1111 is the outermost conducting weir and extends, for example, from the feed weir 1311 up to the longitudinally-axially extending separating weir 113 and at the same time completes a rotation by almost 180°. The closest inner conducting weir 1112 extends, on the other hand, from the separating weir 113 not by an entire 180°, but rather terminates after approximately 170°. The liquid phase thus passes through the first partial path 211 counterclockwise, until it reaches the end of the conducting weir 1112. The flow direction rotates there by 180°, so that the liquid phase flows through the second partial path 212 adjoining the first partial path 211 clockwise, wherein the second partial path 212 is also formed substantially in the form of a semicircular path and is delimited, on the one hand, by the conducting weir 1112 and a closest inner conducting weir 1113. The conducting weir 1113 again extends from the separating weir 113 not by an entire 180°, but rather terminates after approximately 170°. Reaching the end of the second partial path 212, the flow direction again rotates by 180°, so that the liquid phase enters the last partial path 213, which finally opens at the first exit 141 of the tray drain. The third partial path 213 is also formed substantially in the form of a semicircular path and is delimited on the inside by the conducting weir 1114. The liquid phase again passes through the third partial path 213 counterclockwise and finally overflows the first drain weir 1411, to then leave the tray 10 via the first exit 141.

The guiding of the liquid phase in the second section 104 can be embodied mirror-symmetrically thereto. The tray 10 is charged therein with the liquid phase via the second entry 132. The liquid phase passes over the feed weir 1321 and thus enters the first partial path 221 of the second section 104. The first partial path 221 is delimited by the two conducting weirs 1121 and 1122. The first second conducting weir 1121 is the outermost conducting weir of the second section 104 and extends, for example, from the feed weir 1321 up to the longitudinally-axially extending separating weir 113 and at the same time completes a rotation by almost 180°. The next inner conducting weir 1122 extends, on the other hand, from the separating weir 113 not by an entire 180°, but rather terminates after approximately 170°. The liquid phase thus flows through the first partial path 221 clockwise, until it reaches the end of the conducting weir 1122. The flow direction rotates there by 180°, so that the liquid phase flows through the second partial path 222 of the second section 104 adjoining the first partial path 221 counterclockwise, wherein the second partial path 222 is also formed substantially in the form of a semicircular path and is delimited, on the one hand, by the conducting weir 1122 and a closest inner conducting weir 1123. The conducting weir 1123 again extends from the separating weir 113 not by an entire 180°, but rather terminates after approximately 170°. Reaching the end of the second partial path 22, the flow direction again rotates by 180°, so that the liquid phase enters the last partial path 223 of the second section 104, which finally opens at the second exit 142 of the tray drain. The third partial path 223 is also formed substantially in the form of a semicircular path and is delimited on the inside by the conducting weir 1124.

The liquid phase again passes through the third partial path 223 clockwise and finally overflows the second drain weir 1421, to then leave the tray 10 via the second exit 141.

In a further embodiment, all partial paths 211, 212, 213, 221, 222, 223 of the first course path describe a rotation of at least 90° and of at most 180°. The precise number of degrees can be set by the terminus of the conducting weirs 111, 112, as is clear from the above example. For example, it can be provided that the partial paths describe a rotation of somewhat less than 180°, for example, a rotation in the range of 130° to 175°.

According to one embodiment, the first guide means 11, for example, comprising the number of concentrically arranged conducting weirs, can form the first course path 21, 22 for the liquid phase in the form of multiple semicircular paths arranged concentrically in relation to one another, through which the liquid phase passes in succession in alternating rotational directions (clockwise, counterclockwise), wherein the liquid phase runs in this case from the tray edge 101 toward the tray center 102.

The above-mentioned conducting weirs 1111, 1112, 1113, and 1114 and also 1121, 1122, 1123, and 1124 of the first guide means 11 for the liquid phase extend, for example, like a cylinder wall section from the tray 10 against the vertical direction. In this case, one conducting weir can be used to delimit two successive partial paths (for example, the conducting weir 1112, paths 211, 212) of the first course path. Because of the above-mentioned flow direction change of the liquid phase with each transition between two partial paths, the liquid phase flows in opposite directions at such a conducting weir, for example, clockwise on one side and counterclockwise on the other side, i.e., in the other partial path. This can contribute to homogenizing the mass-transfer process, for example, it can promote an absorption of the gas phase by the liquid which is homogenized over the surface.

As has already been explained in the introduction, the tray 10 additionally comprises the second guide means 12 for guiding the temperature-control fluid. The second guide means 12 are arranged and designed for heat exchange with the liquid phase.

The second guide means 12 in particular form the second course path 31, 32 for the temperature-control fluid, for example, by means of said pipelines, such as heating or cooling loops. The second course path 31, 32 overlaps with the first course path 21, 22, in particular in a manner which enables the heat exchange between the liquid phase and the temperature-control fluid.

In one embodiment, it is provided that the temperature-control fluid flows along the second course path 31, 32 in at least one of the partial paths of the first course path 21, 22 of the liquid phase in a direction opposite to the flow direction of the liquid phase, as shown by the directionindicating arrows in FIG. 1. For example, the liquid phase flowing along the paths 21 and 22 thus "sees" during its travel a temperature-control fluid flowing opposite to it in the two middle partial paths 212 and 222. In this manner, an improved energy exchange (i.e., heat exchange) can take place between the liquid phase and the temperature-control fluid.

The second guide means 12 for guiding the temperature-control fluid can form the second course path 31, 32, for example, with a plurality of individual paths arranged concentrically in relation to one another and each extending in the form of a partial circular path, as is shown in FIG. 1 by the dashed lines. Each individual path can be implemented by a pipeline 121.

The inlet 15 and the outlet 16 for the temperature-control fluid can be arranged along the longitudinal axis A intersecting the center of the tray 102, which divides the tray 10, as stated, into the first section 103 and the second section 104. Furthermore, the inlet 15 and the outlet 16 for the temperature-control fluid can be arranged offset in relation to one another by 180°, so that the individual paths of the second course path 31 provided in the first section 103 of the tray 10 only guide the temperature-control fluid in one rotational direction, and so that the individual paths of the second course path 32 provided in the second section 104 of the tray 10 only guide the temperature-control fluid in the opposite rotational direction.

Figure 3:
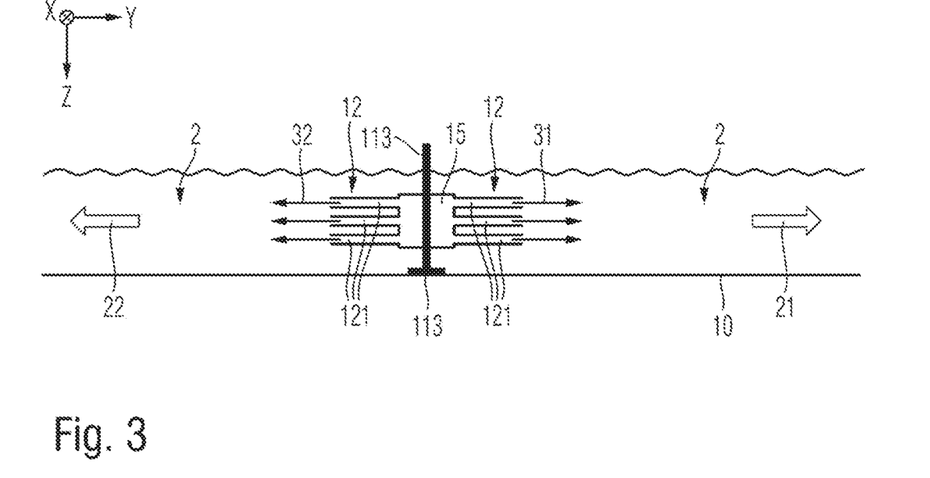
FIG. 3 is a schematic vertical cross-sectional view of a section of a temperature-control fluid inlet of an example tray for a mass-transfer column.
Figure 4:
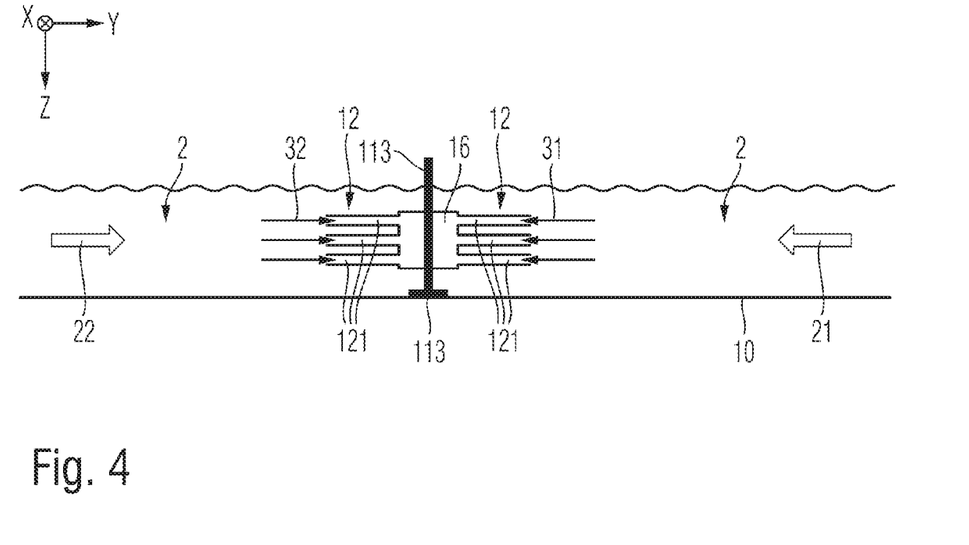
FIG. 4 is a schematic vertical cross-sectional view of a temperature-control fluid outlet of an example tray for a mass-transfer column.

For the exemplary illustration of the above statements, reference is additionally made hereafter to FIG. 3 and FIG. 4, which by way of example show a vertical cross-sectional view of a section of the temperature-control fluid inlet (FIG. 3) or outlet (FIG. 4), respectively.

For example, the inlet 15 extends out from the tray edge 101 in the direction of the tray center 102, for example, along at least 80% of the radius of the tray 10. Similarly, the outlet 16 can extend out from the tray edge 101 in the direction of the tray center 102, for example, also along at least 80% of the radius of the tray 10. The inlet 15 is fed by the temperature-control fluid, and the individual paths, for example, formed by the pipelines 121, of the first section 103 leave the inlet 15 in a counterclockwise direction (course 31), and the individual paths of the second section, for example, also formed by the pipelines 121, leave the inlet 15 in the clockwise direction (course 32).

The individual paths in the first section 103 each guide the temperature-control fluid along a semicircular path 31 counterclockwise by approximately 180°, until the individual paths open into the outlet 16. The individual paths in the second section 104 each guide the temperature-control fluid along a semicircular path 32 clockwise by approximately 180°, until the individual paths of the second section 104 also open into the outlet 16.

Because of this guiding illustrated by way of example of the temperature-control fluid by the second guide means 12, on the one hand, and the liquid phase 2 by the first guide means 11, on the other hand, the implementation of the counterflow principle occurs in the respective middle partial path 212 or 222, respectively, in which the liquid phase 2 "sees" a temperature-control fluid flowing opposite to it. In the two inner partial paths 213 and 223 and the two outer partial paths 211 and 221, the temperature-control fluid and the liquid phase flow in the same rotational direction (counterclockwise in the first section 103 and clockwise in the second section 104).

The embodiment of the inlet 15 and of the outlet 16 can be performed in various ways. In particular, the inlet 15 and the outlet 16 do not necessarily have to be formed monolithically, as is schematically indicated in FIGS. 3 and 4, but rather, for example, could also be formed in two halves, or partial inlets or partial outlets could be provided to implement different fluid control concepts, in order to be able to operate the individual paths or groups of individual paths separately. In this manner, for example, the counterflow principle could also be implemented in all partial paths 211, 212, 213, 221, 222, 223, wherein possibly a somewhat increased construction expenditure would have to be applied.

Because of the guiding in partial circular paths of both the temperature-control fluid and also the liquid phase, the first guide means 11 and the second guide means 12 can be produced comparatively cost-effectively. In particular, the above-described embodiment avoids the necessity of narrow bending radii, both with regard to the conducting weirs 111 and 112, and also the individual paths, which can be implemented by the pipelines 121.

A bending radius of the pipelines 121 is always greater, for example, along at least 80% of the entire second course 31, 32, for example, than a predetermined minimal value. In one embodiment, the minimal value of the bending radius is selected as greater than a material-specific, critical, minimal bending radius. This comparatively large bending radius can result because of the course guiding in semicircular paths. In contrast, to implement a meandering course, as is known, for example, from the document WO 2013/072353 A1 cited at the outset, small bending radii are necessary to implement the 180° turns in a tight space. The large bending radius places significantly lower demands on the mechanical quality of the material of the pipelines 121, whereby the material of the pipelines 121 can be optimized with respect to other properties, for example, with respect to the corrosion resistance, but does not have to be selected with regard to the smallest possible bending radius.

Not only can the first guide means 11 and the second guide means 12 be produced comparatively cost-effectively, but rather the concentric arrangement of the partial circular paths, i.e., the radial offset of the partial paths in relation to one another, permits the setting of the total runway lengths and/or the dwell time of the liquid phase on the tray 10 in a simple manner. Thus, for example, the partial paths could be varied according to length and/or according to number and/or according to the respective width in order to set total runway lengths and/or dwell times.

The pipelines 121 for guiding the temperature-control fluid can extend, as already indicated above, along the entire or at least nearly along the entire first course path 21, 22, for example, in such a manner that the liquid phase comes into direct contact with the outer walls of the pipelines 121. In other words, the pipelines can extend parallel to the flow path of the liquid phase 2. In this case, multiple pipelines 121 can be arranged adjacent to one another, for example, seven pipelines 121, and the pipelines 121 can also be provided in multiple layers, for example, in three layers one on top of another, as is illustrated in FIG. 2 and also in FIGS. 3 and 4.

The tray 10 can be designed as a screen tray, valve tray, bell tray, or tunnel tray.

Figure 5:
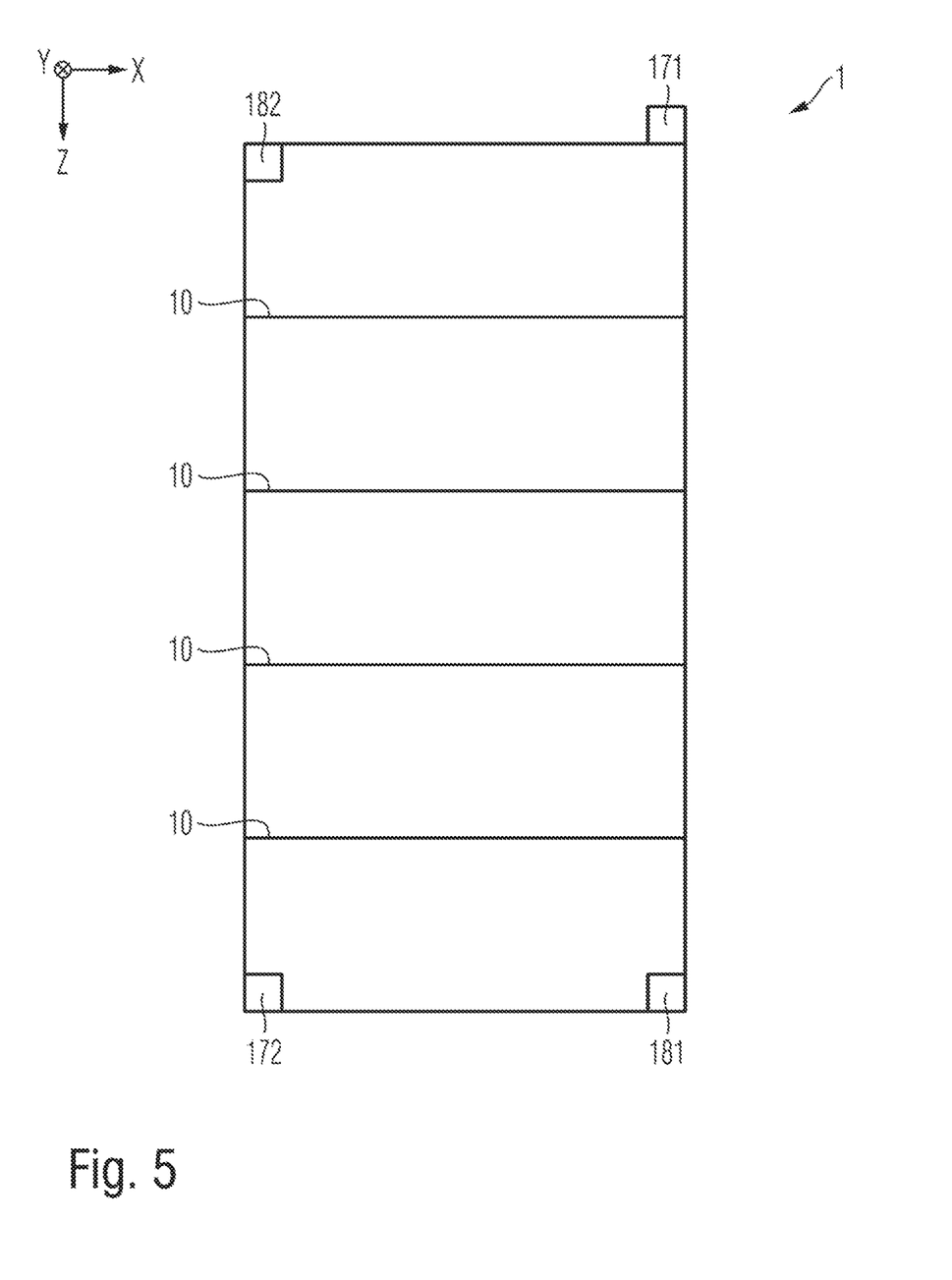
FIG. 5 is a schematic vertical cross-sectional view of a section of an example mass-transfer column.
Figure 6:
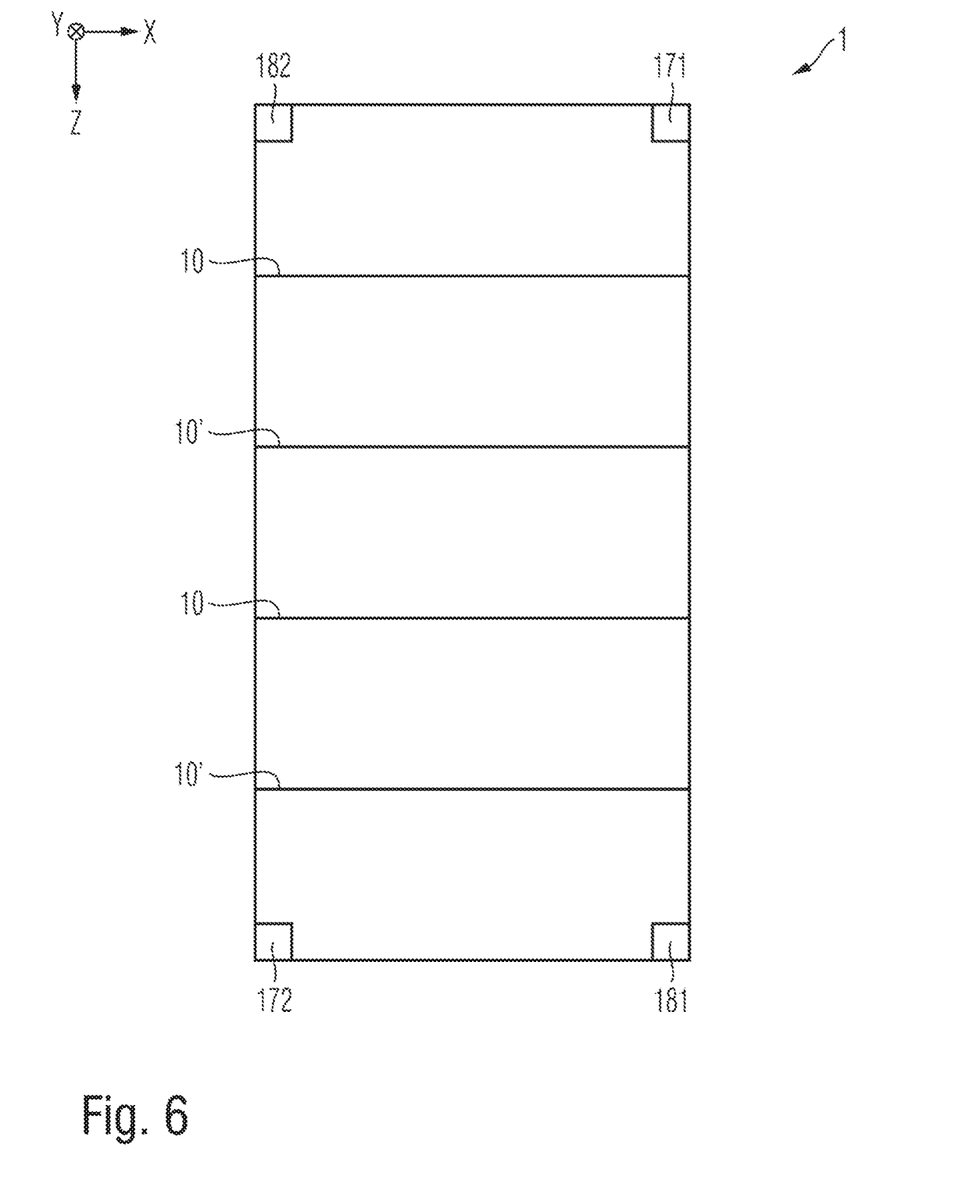
FIG. 6 is a schematic vertical cross-sectional view of a section of another example mass-transfer column.

FIGS. 5 and 6 each schematically show by way of example a vertical cross-sectional view of a section of a mass-transfer column 1 according to one or more embodiments.

The mass-transfer column 1 comprises a plurality of trays 10 or 10' arranged one over another, which can each be designed according to one of the above-described embodiments. The mass-transfer column 1 can be an absorption column, a rectification column, a stripping column, or a distillation column.

For example, the mass-transfer column 1 is an absorption column for producing nitric acid.

The liquid phase is fed to the mass-transfer column 1, for example, via a main entry 171 and discharged via a main exit 172. The gas phase can be fed to the mass-transfer column 1 via a central gas entry 181 and discharged via a central gas exit 182. The liquid phase is thus guided in the mass-transfer column 1 in the vertical direction Z, and the gas phase opposite to the vertical direction Z, as has already been stated. To ensure the contact between the liquid phase and the gas phase, each of the trays 10 or 10' can comprise said mass-transfer elements, for example, gas passage openings As stated, the trays 10 or 10' are arranged one on top of another in the mass-transfer column 1. In principle, it thus results that the tray drain (see reference signs 131 and 132 in FIG. 1) of the respective upper tray 10 or 10' is to be connected to the tray feed (see reference signs 141 and 142 in FIG. 1) of the tray 10 or 10' located underneath. This task can be performed, for example, via a so-called downcomer, which is known in principle to a person skilled in the art.

According to the variant shown in FIG. 6, the flow principle changes from tray 10 to tray 10', so that the design of the downcomer can be embodied simply between the respective trays 10, 10'. Specifically, the downcomer connects the exits 141 and 142 of one tray 10 to a tray 10' located underneath along the vertical direction Z to components of the tray 10' corresponding to the exits 141 and 142 of the tray 10, which form the entries of the tray feed in the tray 10', however. In the tray 10', the liquid phase thus flows from the tray center along the partial paths in the form of semicircular paths to the tray drain at the tray edge, which is formed by components which correspond to the entries 131 and 132 of the tray 10'. From there, a closest downcomer, again along the vertical direction Z, but arranged flush with the tray edge, leads to the tray 10 located underneath, which can implement the flow principle according to FIG. 1, etc.

In the variant shown in FIG. 5, all trays 10 are formed substantially similarly, which can imply, however, that the resulting embodiment of the downcomer between the respective trays 10 is more complex, since the exits arranged close to the tray center can require a downcomer which also extends in the radial direction, so that they can be connected to the entries arranged close to the tray edge of the tray located underneath.

As used here, the terms "comprising", "including", and the like are open terms, which indicate the presence of listed elements or features, but do not exclude additional elements or features. In consideration of the above range of variations and applications, it is to be noted that the present invention is not restricted by the preceding description, and is also not restricted by the appended drawings. Rather, the present invention is solely restricted by the following claims and the legal equivalents thereof.

What is claimed is:

1. A tray for a mass-transfer column, wherein the tray is configured to enable contact between a liquid phase and a gas phase, the tray comprising:
   a tray feed via which the tray is charged with the liquid phase;
   a tray drain via which the liquid phase drains from the tray;
   first guide means for guiding the liquid phase, wherein the first guide means forms a first course path along which the liquid phase flows from the tray feed to the tray drain, the first course path having at least two partial paths that are arranged concentrically relative to one another and that each extend as a partial circular path;
   an inlet for a temperature-control fluid;
   an outlet for the temperature-control fluid; and
   second guide means for guiding the temperature-control fluid for a heat exchange with the liquid phase, wherein the second guide means forms a second course path overlapping with the first course path, which leads from the inlet to the outlet, wherein the temperature-control fluid flows along the second course path in at least one of the at least two partial paths in a direction opposite a flow direction of the liquid phase.

2. The tray of claim 1 wherein the tray feed comprises a first entry that is disposed at an edge of the tray, wherein the tray drain comprises a first exit that is disposed in a center of the tray, wherein the first guide means comprises concentrically arranged conducting weirs that form the first course path.

3. The tray of claim 1 wherein the liquid phase flows in a first of the at least two partial paths along a rotational direction and in a second of the at least two partial paths in a direction opposite the rotational direction.

4. The tray of claim 1 wherein the second guide means for guiding the temperature-control fluid forms the second course path having a plurality of individual paths arranged concentrically to one another and each extending as a partial circular path.

5. The tray of claim 1 wherein the inlet and the outlet for the temperature-control fluid are disposed along a longitudinal axis intersecting a center of the tray, which divides the tray into a first section and a second section.

6. The tray of claim 1 wherein the second guide means for guiding the temperature-control fluid forms the second course path having a plurality of individual paths arranged concentrically to one another and each extending as a partial circular path, wherein the inlet and the outlet for the temperature-control fluid are disposed along a longitudinal axis intersecting a center of the tray, which divides the tray into a first section and a second section, wherein the inlet and the outlet for the temperature-control fluid are positioned offset by 180° relative to one another, wherein the plurality of individual paths of the second course path provided in the first section of the tray guide the temperature-control fluid only in a rotational direction, wherein the plurality of individual paths of the second course path provided in the second section of the tray guide the temperature-control fluid only in the direction opposite the rotational direction.

7. The tray of claim 1 wherein the tray feed comprises a first entry that is disposed at an edge of the tray, wherein the tray drain comprises a first exit that is disposed in a center of the tray, wherein the first guide means comprises at least three concentrically arranged conducting weirs that form the first course path having at least three partial paths linked to one another therein, wherein the inlet and the outlet for the temperature-control fluid are disposed along a longitudinal axis intersecting a center of the tray, which divides the tray into a first section and a second section, wherein the liquid phase passes through the at least three partial paths and changes its flow direction with each transition between two of the at least three partial paths by 180°.

8. The tray of claim 1 wherein the tray feed comprises a first entry that is disposed at an edge of the tray, wherein the tray drain comprises a first exit that is disposed in a center of the tray, wherein the first guide means comprises concentrically arranged conducting weirs that form the first course path, wherein the inlet and the outlet for the temperature-control fluid are disposed along a longitudinal axis intersecting a center of the tray, which divides the tray into a first section and a second section, wherein the tray feed comprises a second entry that is disposed at the edge of the tray, wherein the tray drain comprises a second exit that is disposed in the center of the tray, wherein the first entry and the first exit are located in the first section of the tray, wherein the second entry and the second exit are located in the second section of the tray, wherein the first guide means comprises at least three second conducting weirs that are positioned in the second section of the tray and form the first course path therein having at least three partial paths linked to one another, wherein the at least three partial paths extend concentrically, wherein the liquid phase passes through the at least three partial paths and changes its flow direction by 180° with each transition between two of the at least three partial paths.

9. The tray of claim 1 wherein the inlet and the outlet for the temperature-control fluid are disposed along a longitudinal axis intersecting a center of the tray, which divides the tray into a first section and a second section, wherein the first guide means comprises a separating weir arrangement positioned along the longitudinal axis, which separates the liquid phase in the first section and the liquid phase in the second section.

10. The tray of claim 1 wherein the inlet and the outlet for the temperature-control fluid are disposed along a longitudinal axis intersecting a center of the tray, which divides the tray into a first section and a second section, wherein the second guide means for guiding the temperature-control fluid forms the second course path having a plurality of individual paths arranged concentrically to one another and each extending as a partial circular path, wherein the at least two partial paths formed by the first guide means and the plurality of individual paths are substantially semicircular paths.

11. The tray of claim 10 wherein the second guide means for guiding the temperature-control fluid forms the second course path having the plurality of individual paths arranged concentrically to one another, wherein the inlet and the outlet for the temperature-control fluid are disposed along the longitudinal axis, wherein the inlet and the outlet for the temperature-control fluid are positioned offset by 180° relative to one another, wherein the plurality of individual paths of the second course path provided in the first section of the tray guide the temperature-control fluid only in a rotational direction, wherein the plurality of individual paths of the second course path provided in the second section of the tray guide the temperature-control fluid only in the direction opposite the rotational direction, wherein a flow direction of the liquid phase changes by 180° with each transition between two of the at least two partial paths.

12. The tray of claim 11 wherein the flow direction of the liquid phase changes at least twice by 180° in each of the first section and the second section.

13. The tray of claim 1 wherein the second guide means is configured as pipelines that are positioned for contact with the liquid phase and that extend parallel to the first course path.

14. The tray of claim 1 configured as a screen tray, a valve tray, a bell tray, or a tunnel tray.

15. A mass-transfer column comprising a plurality of trays arranged one on top of another, wherein each of the plurality of trays comprises the tray of claim 1.

* * * * *